United States Patent [19]

Russell

[11] 4,112,165
[45] Sep. 5, 1978

[54] X-RAY FILM MOUNT

[75] Inventor: Malcolm Clifford Russell, Leicester, Mass.

[73] Assignee: Russell Manufacturing Company, Leicester, Mass.

[21] Appl. No.: 688,848

[22] Filed: May 21, 1976

[51] Int. Cl.² .............................................. G09F 1/10
[52] U.S. Cl. .................................. 428/134; 40/158 B; 428/137
[58] Field of Search .............. 40/158 B, 158 R, 53 H, 40/106.1; 355/75; 156/108; 428/138, 139, 140, 1, 137, 134

[56] References Cited

U.S. PATENT DOCUMENTS 2,184,007  12/1939  Staehle ............................... 40/158 R

FOREIGN PATENT DOCUMENTS 500,668  2/1939  United Kingdom ................... 40/158 B
777,310  6/1957  United Kingdom ................... 40/158 B
849,485  9/1960  United Kingdom ................... 40/158 R Primary Examiner—Marion E. McCamish
Attorney, Agent, or Firm—Norman S. Blodgett; Gerry A. Blodgett

[57] ABSTRACT

Mount for film elements consisting of two panels having generally matching apertures, the apertures of one being provided with notches to expose the coating of a visually-evident nature provided on the inner surface of the other to assist in the insertion of the film elements.

2 Claims, 3 Drawing Figures

U.S. Patent    Sept. 5, 1978    4,112,165
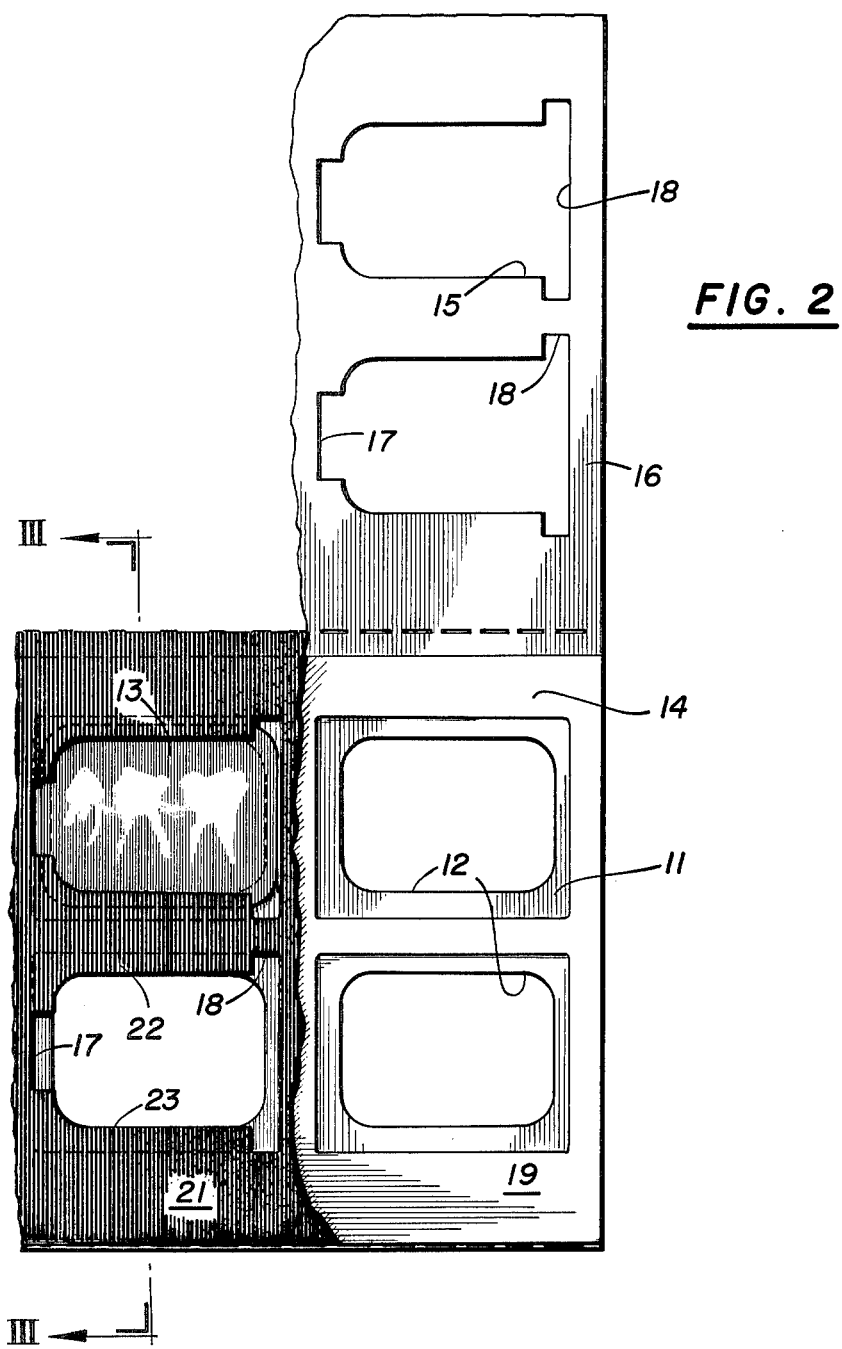
FIG. 2
FIG. 3
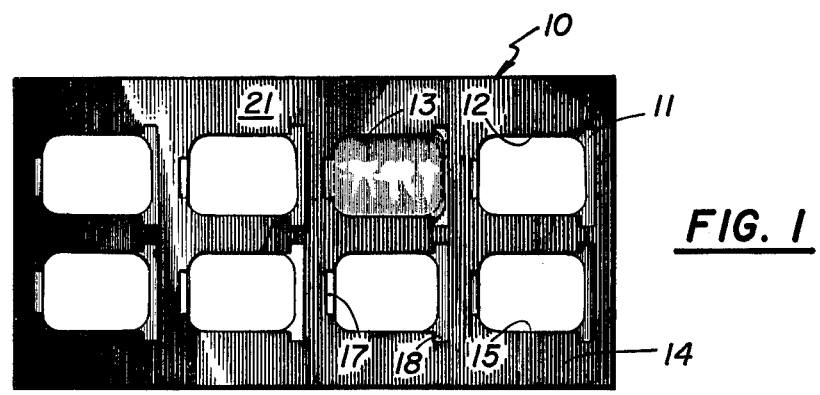
FIG. 1

X-RAY FILM MOUNT

BACKGROUND OF THE INVENTION

It is common practice to provide cardboard holders for film elements, particularly in a dentist's office, where the film elements are small rectangular X-ray films. The film is held by sliding its margin into an unglued area between two layers of cardboard, so that the margin of each film is held but the center is coextensive with an aperture so that it can be visually inspected by means of a light behind the film. Because the films are thin and because the unglued portions are between two layers of cardboard, it is very difficult to slide the film into its aperture. Since the mounting of such films in cardboard holders is a frequently-occurring job in a dentist's office, a considerable amount of time is spent in this operation that could be better spent in providing dental care, etc. These and other difficulties experienced with the prior art devices have been obviated in a novel manner by the present invention.

It is, therefore, an outstanding object of the invention to provide a mount for film elements in which means is provided to make it easier to insert the film elements in the mount.

Another object of this invention is the provision of a film mount in which the critical areas in which the film is inserted is made visually evident to the user.

A further object of the present invention is the provision of a mount for film elements in which the operation of mounting the film elements can take place more rapidly with a consequent saving in labor.

With these and other objects in view, as will be apparent to those skilled in the art, the invention resides in the combination of parts set forth in the specification and covered by the claims appended hereto.

SUMMARY OF THE INVENTION

In general, the invention consists of a mount for film elements having a first panel with primary apertures and a second panel with secondary apertures. Both apertures are generally slightly smaller than a film element, but the secondary apertures are provided with laterally-extending notches. The panels are connected together by adhesive and held together in face-to-face relationship with the primary and secondary apertures in substantial registry. A coating of visually-evident nature is provided on the inner surface of the first panel so as to be exposed by the said notches in the second panel.

More specifically, the outer surface of the second panel has a dark color and the coating on the inner surface of the first panel is of a relatively light contrasting color, preferably white. A strip of adhesive-free inner surface is provided around each aperture to allow the insertion of the film element.

BRIEF DESCRIPTION OF THE DRAWINGS

The character of the invention, however, may be best understood by reference to one of its structural forms, as illustrated by the accompanying drawings in which:

FIG. 1 is a front elevational view of a mount incorporating the principles of the present invention, and FIG. 2 is an enlarged view of a portion of the mount in dis-assembled form showing details of construction.

FIG. 3 is an edgewise cross-sectional view of the X-ray film mount.

DESCRIPTION OF THE PREFERRED EMBODIMENT

Referring first to FIG. 1, wherein are best shown the general features of the invention, the mount, indicated generally by the reference numeral 10, is shown in use with a film element 13. In the illustration, the film element 13 is shown as a dental X-ray film of generally rectangular shape with rounded corners. The mount is provided with a first panel 11 having primary apertures 12, each of which is slightly smaller than one of the film elements 12. It is also provided with a second panel 14 having secondary apertures 15. The secondary apertures are generally of the same shape as the primary apertures.

FIG. 2 shows the details of construction of the mount; particularly, it shows that each of the secondary apertures 15 is provided with a rectangular notch 17 at one end and an elongated notch 18 at the other end. The notch 17 is in the form of a narrow rectangle whose length is less than the width of the aperture 15, while the notch 18 is also in the form of a narrow rectangle whose length is greater than the width of the aperture. The inner surface of the first panel 11 is provided with a coating 19 of a visually evident nature. The inner surface of the second panel 14 is provided with a pattern 16 of adhesive covering all of its surface with the exception of a strip 22 and a strip 23 on either side of the aperture 15, particularly in the portion of the aperture not occupied by the notches 17 and 18. In FIG. 3 the orientation of the second panel 14 to the first panel 11 is made clear. As is evident in the drawings, the coating 19 on the inner surface of the first panel 11 is exposed by the notches 17 and 18 in the secondary apertures 15. In the preferred embodiment, the outer surface of the second panel 14 is provided with a dark color and the coating 19 on the inner surface of the first panel is of a relatively light contrasting, preferably white.

The use of the above mount will be readily understood in view of the above description. When the film is to be attached to the mount, the leading end is inserted between the panels making use of the fact that the notch 18 allows entry into the unglued strips 22 and 23 between the two panels. Final insertion of the film element 13 in this manner (from right to left in FIG. 1) results in the forward end of the film element reaching the end of the strips 22 and 23 and at that time covering up the white patch exposed by the notch 17. In other words, the white coating 19 exposed by the notch 18 permits the film element to be readily inserted into the entry to the unglued strips 22 and 23, while the white coating exposed by the notch 17 indicates to the person mounting the film elements, that the film has gone as far as is necessary. In this way, the operation of mounting the films is promoted and accelerated, so that the person in the dentist's office who performs the operation is available for other occupations, such as dental care for patients. This is particularly true in the case where the dentist mounts the films himself, so that the time spent in performing this operation is a costly one. Furthermore, the mere fact that it is difficult to insert the film elements in the prior art devices, but easy to do it by use of the present invention, means that there is less emotional exasperation than in the past.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A mount for X-ray film element, comprising:
   (a) a first panel having primary apertures, each of which is smaller than a film element,
   (b) a second panel having secondary apertures similar to the primary apertures,
   (c) notches extending from opposite ends of each of the secondary apertures comprising, a first notch which is rectangular and whose length is less than the width of the aperture, and a second notch which is elongated and whose length is greater than the width of a film element,
   (d) a coating of visually-evident nature provided on the inner surface of the first panel to be exposed by the said notches in the second panel, the outer surface of the second panel having a dark color and the said coating on the inner surface of the first panel being of a relatively light contrasting color, and
   (e) an adhesive connecting the first and second panels in a face-to-face relationship with the primary and secondary apertures in substantial registry with the exception that a strip of adhesive-free inner surface is provided around the primary aperture to allow the insertion of the film element.

2. A mount as recited in claim 1, wherein the said coating is white in color.

* * * * *